US012759532B2

(12) United States Patent
Yonemura

(10) Patent No.: US 12,759,532 B2
(45) Date of Patent: Oct. 13, 2026

(54) CONTROL DEVICE

(71) Applicant: TOYOTA JIDOSHA KABUSHIKI KAISHA, Toyota (JP)

(72) Inventor: Kohichiroh Yonemura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/047,955

(22) Filed: Feb. 7, 2025

(65) Prior Publication Data

US 2025/0360908 A1 Nov. 27, 2025

(30) Foreign Application Priority Data

May 24, 2024 (JP) ................................ 2024-084801

(51) Int. Cl.

| | |
|---|---|
| ***B60W 20/16*** | (2016.01) |
| ***B60W 10/06*** | (2006.01) |
| ***B60W 10/08*** | (2006.01) |
| ***F01N 3/021*** | (2006.01) |
| ***F02N 11/08*** | (2006.01) |

(52) U.S. Cl.

CPC ............ *B60W 20/16* (2016.01); *B60W 10/06* (2013.01); *B60W 10/08* (2013.01); *F01N 3/021* (2013.01); *F02N 11/0803* (2013.01); *B60W 2540/049* (2020.02)

(58) Field of Classification Search

CPC .................................................... B60W 20/16

See application file for complete search history.

(56) References Cited

U.S. PATENT DOCUMENTS

| | | | |
|---|---|---|---|
| 8,355,851 B2 | 1/2013 | Inoue et al. | |
| 8,370,040 B2 | 2/2013 | Inoue et al. | |
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |
| 10,017,178 B2 | 7/2018 | Morimoto et al. | |
| 10,118,617 B2 | 11/2018 | Urano et al. | |
| 10,486,698 B2 | 11/2019 | Masui et al. | |
| 2018/0149063 A1* | 5/2018 | Oshiumi ............. | B60W 30/182 |
| 2019/0295419 A1 | 9/2019 | Tosa et al. | |
| 2020/0049095 A1* | 2/2020 | Kuroda ................... | F01N 3/023 |

FOREIGN PATENT DOCUMENTS

JP 2022-062890 A 4/2022

* cited by examiner

*Primary Examiner* — Imran K Mustafa
(74) *Attorney, Agent, or Firm* — SoraIP, Inc.

(57) ABSTRACT

The control device performs an occupant number acquiring process of acquiring occupant number NM based on the detection result of the occupant detection sensor. The control device performs start-up control for starting the engine when hybrid electric vehicle is driven by the driving force of the motor generator without operating the engine and satisfies at least one of a condition that the dilution amount of the oil stored in the oil pan exceeds a predetermined dilution amount and a condition that the accumulation amount of the particulate matter accumulated in the particulate filter exceeds a predetermined accumulation amount. The control device performs relaxation control for relaxing the execution condition when the number of occupants NM is the first number of occupants than the execution condition when the number of occupants NM is the second number larger than the first number of occupants.

6 Claims, 4 Drawing Sheets

CONTROL DEVICE

CROSS-REFERENCE TO RELATED APPLICATION

This application claims priority to Japanese Patent Application No. 2024-084801 filed on May 24, 2024, incorporated herein by reference in its entirety.

BACKGROUND

1. Technical Field

The present disclosure relates to a control device.

2. Description of Related Art

Japanese Unexamined Patent Application Publication No. 2022-062890 (JP 2022-062890 A) describes a hybrid electric vehicle. The hybrid electric vehicle includes an engine, a motor generator, and a control device. The engine includes a particulate filter and an oil pan. The particulate filter is provided in an exhaust passage of exhaust gas discharged from the engine. The oil pan stores oil. The motor generator is a drive source different from the engine.

The control device controls the hybrid electric vehicle. The control device executes a dilution amount calculation process for calculating a dilution amount of the oil stored in the oil pan. The control device executes a deposition amount calculation process for calculating a deposition amount of particulate matter deposited on the particulate filter.

SUMMARY

In the hybrid electric vehicle as described in JP 2022-062890 A, the control device may cause the vehicle to travel using a driving force of the motor generator without operating the engine. In this state, the control device may execute start-up control for starting the engine in response to satisfaction of at least either of a condition that the dilution amount exceeds a specified dilution amount determined in advance and a condition that the deposition amount exceeds a specified deposition amount determined in advance.

The number of occupants in the hybrid electric vehicle may vary. The occupants in the hybrid electric vehicle may lose comfort due to noise, vibrations, and the like caused by the start-up of the engine. Therefore, when the number of occupants in the hybrid electric vehicle is large, many occupants may lose comfort due to the start-up of the engine.

To solve the above problem, the present disclosure provides a control device to be applied to a hybrid electric vehicle including an engine including a particulate filter provided in an exhaust passage and an oil pan that stores oil, a motor generator serving as a drive source different from the engine, and an occupant detection sensor configured to detect an occupant.

The control device is configured to execute:

a dilution amount calculation process for calculating a dilution amount of the oil stored in the oil pan;

a deposition amount calculation process for calculating a deposition amount of particulate matter deposited on the particulate filter; and an occupant number acquisition process for acquiring the number of the occupants based on a detection result from the occupant detection sensor.

The control device is configured to execute:

start-up control for starting the engine in response to satisfaction of an execution condition that is satisfaction of at least either of a condition that the dilution amount exceeds a specified dilution amount determined in advance and a condition that the deposition amount exceeds a specified deposition amount determined in advance in a state in which the hybrid electric vehicle is traveling using a driving force of the motor generator without operating the engine; and relaxation control for relaxing the execution condition when the number of the occupants is a first number compared to the execution condition when the number of the occupants is a second number larger than the first number.

In the above configuration, through the relaxation control, the execution condition when the number of the occupants is the first number is relaxed compared to that when the number of the occupants is the second number. Therefore, when the number of the occupants is the first number, the control device can execute the start-up control more easily than when the number of the occupants is the second number. Thus, the engine is driven when the number of the occupants is the first number, thereby reducing the dilution amount and the deposition amount. Therefore, the control device reduces the occurrence of a state in which the dilution amount and the deposition amount are large when the number of the occupants is the second number. As a result, the control device can suppress an increase in the opportunity of the start-up control when the number of the occupants is the second number. Accordingly, the control device can suppress an increase in the number of occupants who lose comfort due to the start-up of the engine.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
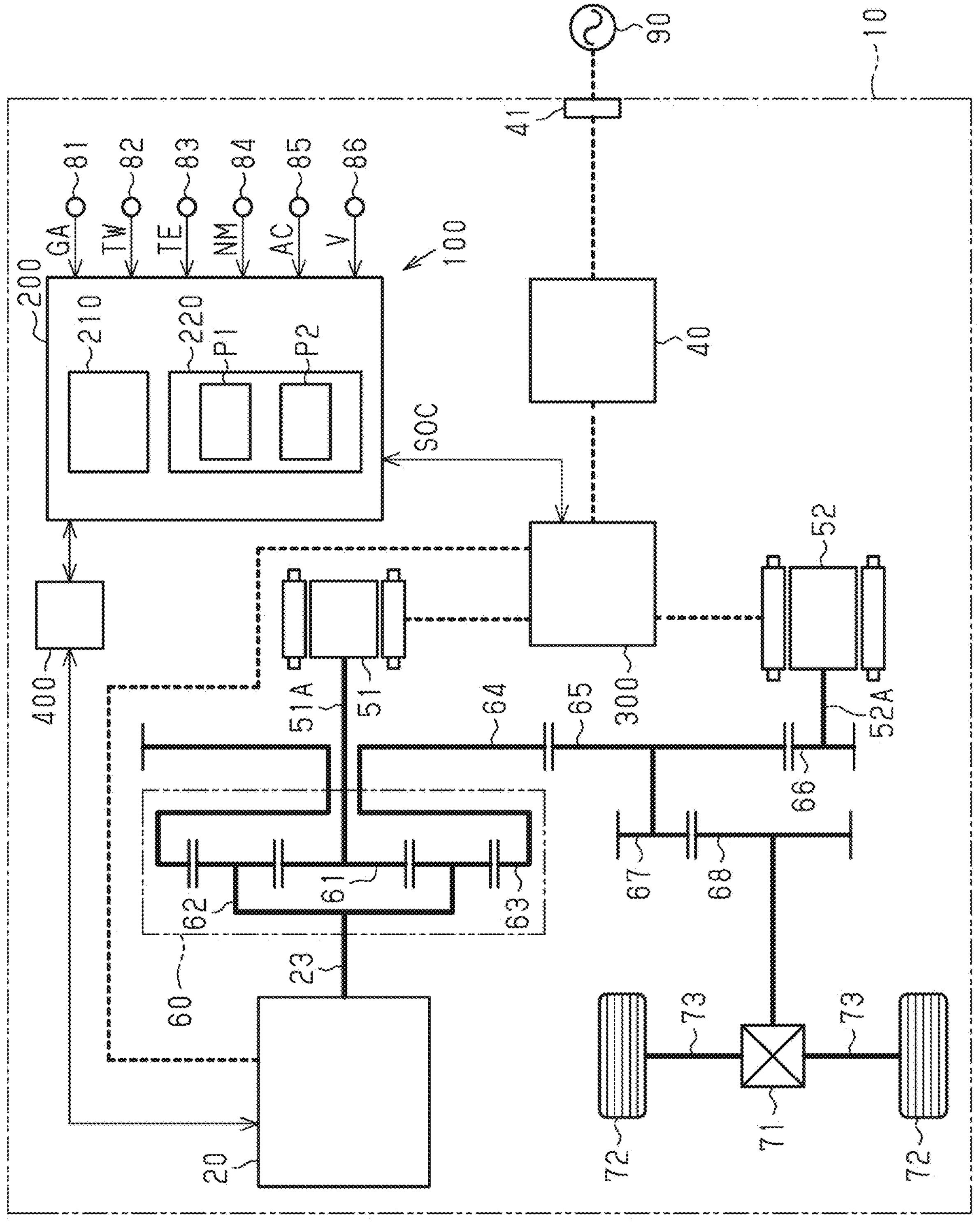
FIG. 1 is a schematic diagram of a hybrid electric vehicle.

Hereinafter, an embodiment of a control device applied to a hybrid electric vehicle will be described referring to the drawings.

Summary of Hybrid Electric Vehicle

As illustrated in FIG. 1, hybrid electric vehicle 10 includes an engine 20 as a drive source.

Figure 2:
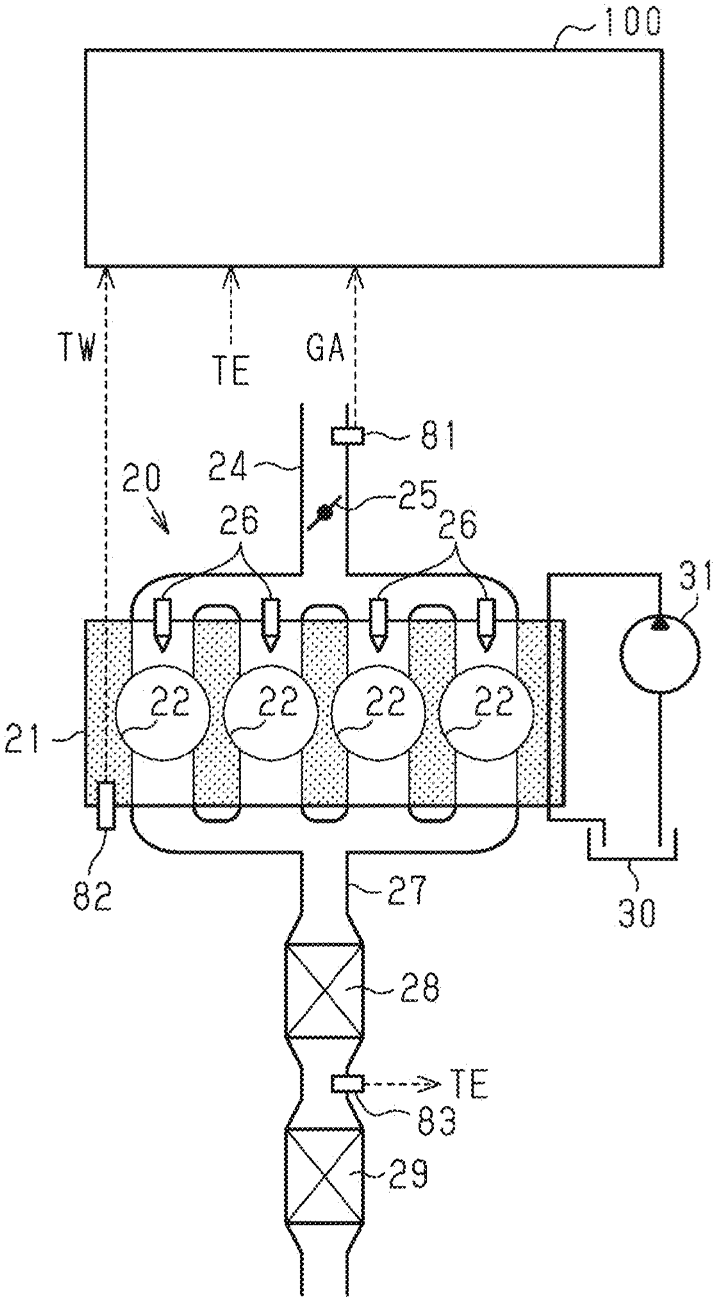
FIG. 2 is a schematic diagram of an engine.

As illustrated in FIG. 2, the engine 20 includes an engine main body 21. The engine main body 21 includes a plurality of cylinders 22. The cylinder 22 is a space for burning an air-fuel mixture of fuel and intake air. The crankshaft 23 shown in FIG. 1 rotates in response to combustion of the air-fuel mixture in the cylinder 22.

As illustrated in FIG. 2, the engine 20 includes an intake passage 24, a throttle valve 25, and a plurality of injectors 26. The intake passage 24 is a passage for introducing intake air into each cylinder 22. The downstream side of the intake passage 24 is connected to each cylinder 22. The throttle valve 25 is located in the middle of the intake passage 24.

The throttle valve 25 adjusts the intake air volume GA. The injector 26 is provided for each cylinder 22. The injector 26 is located downstream of the throttle valve 25 in the intake passage 24. The injector 26 injects fuel. The fuel injected by the injector 26 reaches the inside of the cylinder 22 via the intake passage 24. That is, the injector 26 injects fuel to be supplied into the cylinder 22. Although not shown, the engine 20 includes a plurality of spark plugs. The spark plug is provided for each cylinder 22. The spark plug ignites the air-fuel mixture in the cylinder.

The engine 20 includes an exhaust passage 27, a catalytic converter 28, and a particulate filter 29. The exhaust passage 27 is a passage for discharging exhaust gas from each of the cylinders 22. An upstream side of the exhaust passage 27 is connected to each of the cylinders 22. The catalytic converter 28 is located in the exhaust passage 27. Catalytic converter 28 includes a three-way catalyst. The catalytic converter 28 oxidizes hydrocarbons contained in the exhaust into water and carbon dioxide. The catalytic converter 28 oxidizes carbon monoxide contained in the exhaust gas to carbon dioxide. The catalytic converter 28 reduces the nitride oxide contained in the exhaust gas to nitrogen. The particulate filter 29 is located downstream of the catalytic converter 28 in the exhaust passage 27. The particulate filter 29 collects particulate matter contained in the exhaust gas.

The engine 20 includes an oil pan 30 and an oil pump 31. The oil pan 30 stores oil for lubricating the respective locations of the engine 20. The oil pump 31 feeds the oil stored in the oil pan 30 to the respective locations of the engine 20 and other devices. Oil supplied to various parts of the engine 20 and other devices returns to the oil pan 30 again. Thus, the oil stored in the oil pan 30 lubricates the engine 20.

As illustrated in FIG. 1, hybrid electric vehicle 10 includes a battery 40, a first motor generator 51, and a second motor generator 52. The battery 40 stores electric power. The first motor generator 51 and the second motor generator 52 have a function of a motor as a driving source that generates a driving force in response to power supply from the battery 40. The first motor generator 51 and the second motor generator 52 have a function as a generator that generates electric power to charge the battery 40 by receiving power from the outside.

Hybrid electric vehicle 10 includes a connector 41 that can be connected to an external power supply 90. Therefore, the battery 40 can also be charged by electric power supplied from the external power supply 90. That is, hybrid electric vehicle 10 is plug-in hybrid electric vehicle.

Hybrid electric vehicle 10 includes a planetary gear mechanism 60, a differential mechanism 71, and drive wheels 72. The planetary gear mechanism 60 has three rotating elements: a sun gear 61, a planetary carrier 62, and a ring gear 63. The planetary carrier 62 of the planetary gear mechanism 60 is coupled to the crankshaft 23. The sun gear 61 of the planetary gear mechanism 60 is coupled to the first input shaft 51A. The first input shaft 51A is coupled to the rotor of the first motor generator 51. The first input shaft 51A is a rotating shaft of the first motor generator 51.

The ring gear 63 of the planetary gear mechanism 60 is coupled to the counter drive gear 64. The ring gear 63 and the counter drive gear 64 rotate together. The counter drive gear 64 meshes with the counter driven gear 65. The counter driven gear 65 meshes with the reduction gear 66. The reduction gear 66 is coupled to the second input shaft 52A. The second input shaft 52A is coupled to the rotor of the second motor generator 52. The second input shaft 52A is a rotating shaft of the second motor generator 52.

The counter driven gear 65 is connected to the final drive gear 67. The counter driven gear 65 and the final drive gear 67 rotate together. The final drive gear 67 meshes with the final driven gear 68. The final driven gear 68 is connected to the drive shaft 73 of the drive wheel 72 via the differential mechanism 71. That is, the torque generated by the drive wheels 72 is transmitted to the second input shaft 52A via the various gears.

Hybrid electric vehicle 10 includes an airflow meter 81, a coolant temperature sensor 82, an exhaust gas temperature sensor 83, and an occupant detection sensor 84. Hybrid electric vehicle 10 includes an accelerator position sensor 85, a vehicle speed sensor 86, and a control device 100.

As illustrated in FIG. 2, the airflow meter 81 detects the intake air volume GA. The airflow meter 81 is located upstream of the throttle valve 25 of the intake passage 24. The airflow meter 81 enters the intake air volume GA into the control device 100.

The coolant temperature sensor 82 detects a coolant temperature TW which is a temperature of the coolant for cooling the engine 20. The coolant temperature sensor 82 is located in a water jacket partitioned by the engine main body 21. The coolant temperature sensor 82 inputs the coolant temperature TW to the control device 100.

The exhaust gas temperature sensor 83 detects the exhaust temperature TE. The exhaust gas temperature sensor 83 is located on the downstream side of the catalytic converter 28 in the exhaust passage 27 and on the upstream side of the particulate filter 29. The exhaust gas temperature sensor 83 inputs the exhaust gas temperature TE to the control device 100.

As illustrated in FIG. 1, the occupant detection sensor 84 detects an occupant number NM that is the number of occupants riding on hybrid electric vehicle 10. The occupant includes a driver and a passenger. The occupant detection sensor 84 is located near the entrance of hybrid electric vehicle 10. For example, when the main power of hybrid electric vehicle 10 is turned on, the occupant detection sensor 84 counts up a counter indicating the number of occupants NM as the driver gets on. When the main power of hybrid electric vehicle 10 is turned off, the occupant detection sensor 84 counts down a counter indicating the occupant count NM as the driver gets off. In addition, the occupant detection sensor 84 counts up a counter indicating the occupant count NM as the passenger gets on the passenger by bringing the contactless card of the passenger closer to the passenger at the time of boarding. Then, the occupant detection sensor 84 counts down the counters indicating the occupant count NM as the passenger gets off by bringing the non-contact cards of the same passenger closer to each other at the time of getting off. As described above, the occupant detection sensor 84 detects the occupant count NM on the basis of the operation at the time of driving by the driver and the operation at the time of getting on and off for the passenger to pay the fare. The occupant detection sensor 84 inputs the occupant number NM to the control device 100.

The accelerator position sensor 85 detects the accelerator manipulated variable AC. The accelerator position sensor 85 inputs the accelerator manipulated variable AC to the control device 100. The vehicle speed sensor 86 detects the vehicle speed V. The vehicle speed sensor 86 inputs the vehicle speed V to the control device 100.

In the control device,

Hybrid electric vehicle 10 includes a control device 100 that controls hybrid electric vehicle 10. The control device 100 includes a system control unit 200, a power control unit 300, and an engine control unit 400.

The system control unit 200 comprehensively controls the entire vehicle. The system control unit 200 includes a CPU 210 and memories 220. The memory 220 stores various programs. CPU 210 executes various programs stored in the memories 220. The memory 220 stores a start control program P1 and a relaxation control program P2, which will be described later.

The power control unit 300 controls the first motor generator 51 and the second motor generator 52. The power control unit 300 is connected to the system control unit 200. Although not shown, the system control unit 200 includes a control unit, an inverter, and a converter. The power control unit 300 operates based on a command from the system control unit 200. The power control unit 300 adjusts the amount of power supplied from the battery 40 to the first motor generator 51 and the second motor generator 52 and the amount of charge from the first motor generator 51 and the second motor generator 52 to the battery 40.

The power control unit 300 acquires a current, a voltage, and a temperature of the battery 40. The power control unit 300 calculates a state-of-charge index SOC, which is a ratio of the remaining charge amount to the charge capacity of the battery 40, based on the current, the voltage, and the temperature.

The engine control unit 400 controls the engine 20. The engine control unit 400 is connected to the system control unit 200. The engine control unit 400 controls the engine 20 based on a command from the system control unit 200.

The power control unit 300 and the engine control unit 400 are respectively connected to the system control unit 200. The system control unit 200, the power control unit 300, and the engine control unit 400 share information based on a detection signal input from a sensor and calculated information.

Based on these pieces of information, the system control unit 200 outputs a command to the engine control unit 400 and controls the engine 20 through the engine control unit 400. The system control unit 200 outputs a command to the power control unit 300 based on the information. Accordingly, the system control unit 200 controls the first motor generator 51 and the second motor generator 52 and controls charging of the battery 40 through the power control unit 300. In this way, the control device 100 controls hybrid electric vehicle 10.

Outline of Vehicle Control

Next, control of hybrid electric vehicle 10 performed by the control device 100 will be described.

CPU 210 calculates a required output, which is a required value of the output of hybrid electric vehicle 10, based on the accelerator manipulated variable AC and the vehicle speed V. Then, CPU 210 determines the torque distribution of the engine 20, the first motor generator 51, and the second motor generator 52 in accordance with the required power, the state-of-charge index SOC of the battery 40, and the like. CPU 210 controls the power of the engine 20 and the power running/regeneration by the first motor generator 51 and the second motor generator 52. CPU 210 switches the traveling mode of hybrid electric vehicle 10 according to the magnitude of the charge state index SOC.

When the charge status indicator SOC exceeds a certain level, CPU 210 selects the motor running mode in which the motor is driven by the driving force of the second motor generator 52 without operating the engine 20. That is, CPU 210 selects the motor running mode when there is enough room for the remaining charge of the battery 40.

On the other hand, when the state-of-charge index SOC becomes equal to or lower than a certain level, CPU 210 selects a hybrid-mode driving by using the engine 20 in addition to the first motor generator 51 and the second motor generator 52.

Series of Operations for Start-Up Control

Next, a series of processes related to the start control performed by the control device 100 when the motor running mode is selected and the execution-condition EC is satisfied will be described. CPU 210 executes the start control program P1 at a predetermined cycle when the motor running mode is selected.

Figure 3:
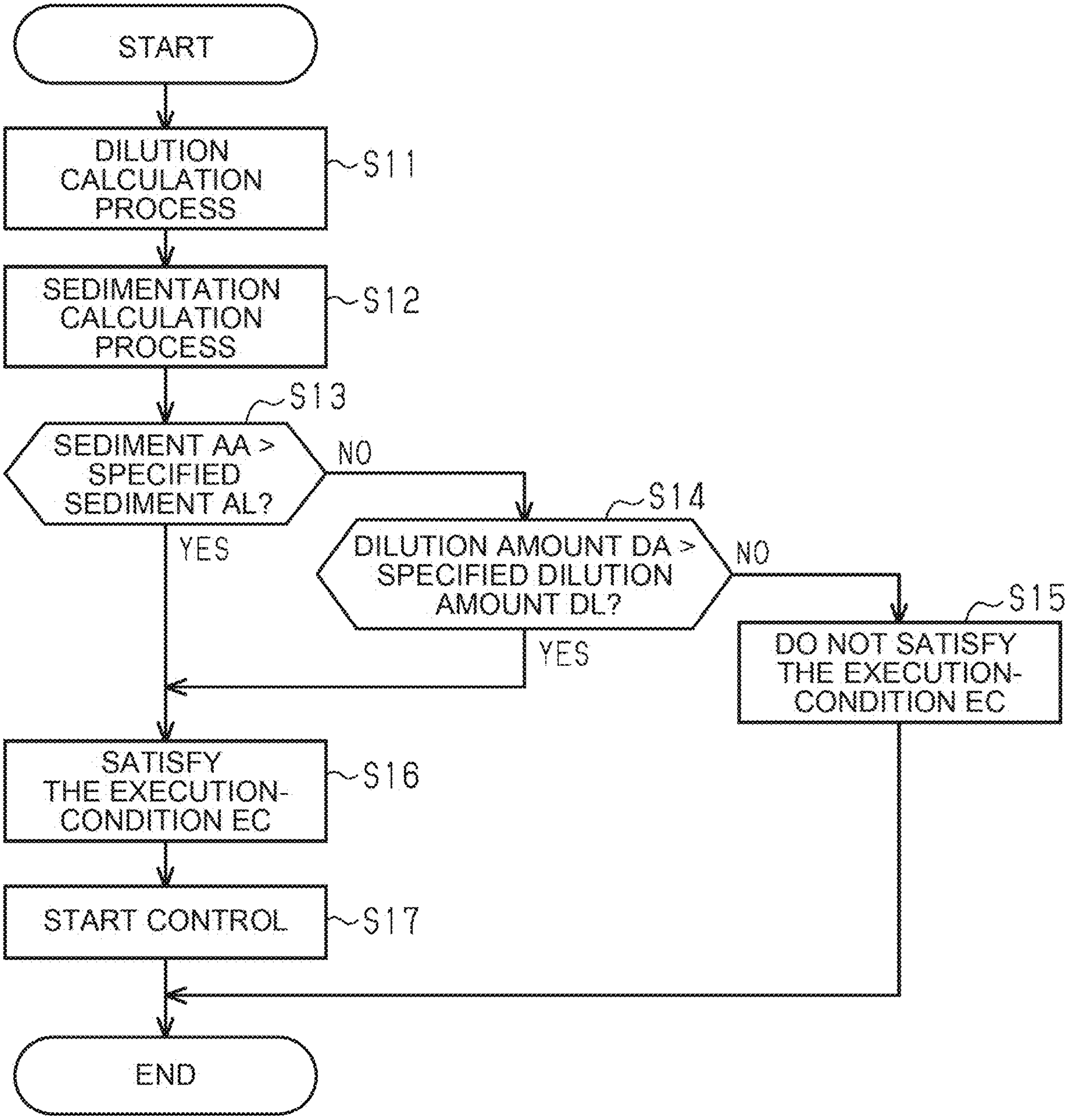
FIG. 3 is a flow chart illustrating a series of processes for starting control.

As shown in FIG. 3, when CPU 210 starts executing the start control program P1, it first performs a S11 process. In S11 process, CPU 210 performs a dilution amount calculation process. In the dilution amount calculation process, CPU 210 calculates the dilution amount DA of the oil stored in the oil pan 30. Specifically, CPU 210 calculates a larger amount of fluid mixed in the oil, for example, a larger amount of fuel/water, as the intake air amount GA increases. CPU 210 calculates a larger quantity of the liquid volatilized from the oil as the coolant temperature TW increases. Then, CPU 210 calculates a new dilution amount DA by adding a difference obtained by subtracting the amount of liquid volatilized from the oil from the amount of liquid mixed in the oil to the dilution amount DA calculated in the previous cycle. Thereafter, CPU 210 advances the process to S12.

In S12, CPU 210 performs a deposit volume calculation process. In the deposition amount calculation process, CPU 210 calculates a deposition amount AA of the particulate matter deposited on the particulate filter 29. Specifically, CPU 210 subtracts the regeneration amount, which is the amount of particulate matter burned in the particulate filter 29, from the production amount, which is the amount of particulate matter newly generated. Then, CPU 210 calculates a new deposition amount AA by adding the difference to the deposition amount AA calculated in the previous cycle. CPU 210 calculates the generation amount of the particulate matter as a larger value as the intake air amount GA increases and the fuel-injection amount injected from the injector 26 increases. In addition, CPU 210 calculates the regeneration rate as 0 when the exhaust-gas temperature TE is less than the ignition point of the particulate matter. When the exhaust gas temperature TE is equal to or higher than the ignition point of the particulate matter, CPU 210 calculates the regeneration rate as a larger value as the exhaust gas temperature TE increases. Thereafter, CPU 210 advances the process to S13.

In S13, CPU 210 determines whether the deposit AA exceeds a defined deposit AL. The defined deposit AL is set by executing the relaxation control programming P2 described later. When the deposition amount AA is less than or equal to the defined deposition amount AL (S13: NO), CPU 210 advances the process to S14.

In S14, CPU 210 determines whether the dilution DA exceeds the specified dilution DL. The specified dilution amount DL is set by executing the relaxation control program P2 described later. When the dilution DA is less than or equal to the specified dilution DL (S14: NO), CPU 210 proceeds to S15.

In S15, CPU 210 determines that the execution-condition EC is not satisfied. That is, S13 and S14 are processes for determining whether or not the execution-condition EC is satisfied. Thereafter, CPU 210 ends the series of processes without starting the engine 20.

On the other hand, when the deposition amount AA exceeds the defined deposition amount AL (S13: YES) or when the dilution amount DA exceeds the defined dilution amount DL (S14: YES), CPU 210 advances the process to S16.

In S16, CPU 210 determines that the execution-condition EC is satisfied. That is, the execution-condition EC is that the deposition amount AA exceeds the specified deposition amount AL and/or the dilution amount DA exceeds the specified dilution amount DL. Thereafter, CPU 210 advances the process to S17.

In S17, CPU 210 performs start control. In the start control, CPU 210 starts the engine 20. Specifically, CPU 210 performs a volatilization process and a filter regeneration process in the start-up control. In the volatilization process, CPU 210 volatilizes and removes fuels and water contained in the oil stored in the oil pan 30. In the volatilization process, CPU 210 increases the calorific value of the engine 20 by driving the engine 20, so that the temperature of the oil stored in the oil pan 30 is set to a temperature sufficient to volatilize the fuel and the water. In the filter regeneration process, CPU 210 is removed by burning the particulate matter deposited on the particulate filter 29. In the filter regeneration process, CPU 210 drives the engine 20 to increase the calorific value of the engine 20, thereby raising the temperature of the particulate filter 29. Thereafter, CPU 210 rotates the crankshaft 23 by the first motor generator 51 to idle the engine 20, thereby supplying oxygen to the particulate filter 29. This causes CPU 210 to burn the particulate matter deposited on the particulate filter 29. After that, CPU 210 drives the engine 20 for a predetermined period of time, and then terminates the series of processes.

Series of Processing for Mitigation Control

Next, a series of processing related to the relaxation control performed by the control device 100 when the motor running mode is selected will be described. The relaxation control is a control for relaxing the execution-condition EC. CPU 210 executes the relaxation control program P2 at a predetermined cycle when the motor running mode is selected.

Figure 4:
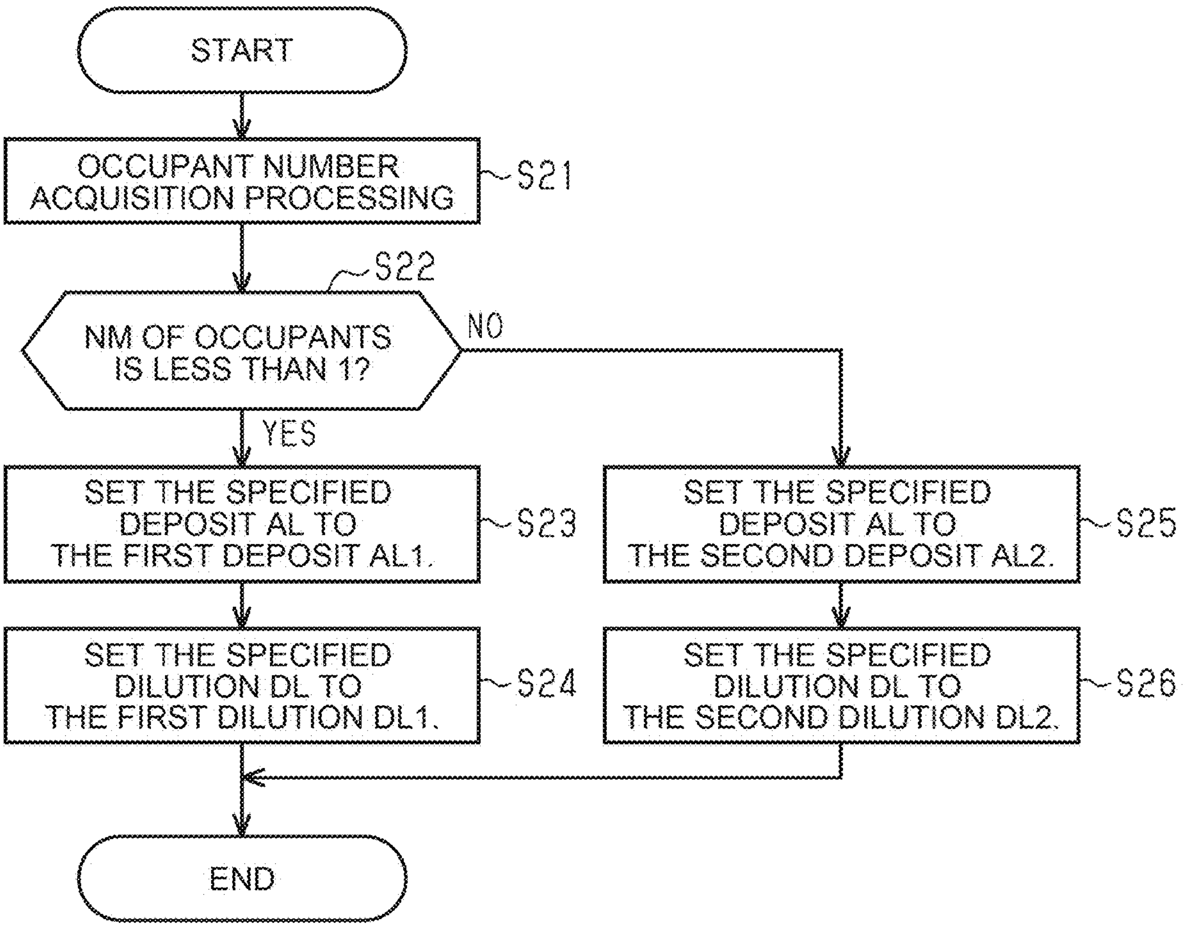
FIG. 4 is a flowchart illustrating a series of processes related to the relaxation control.

As illustrated in FIG. 4, when CPU 210 starts executing the relaxation control programming P2, it first performs a S21 process. In S21, CPU 210 performs an occupant count acquiring process. In the occupant number acquiring process, CPU 210 acquires the occupant number NM based on the detection result of the occupant detection sensor 84. In the present embodiment, the number of occupants NM is detected. Thereafter, CPU 210 advances the process to S22.

In S22, CPU 210 determines whether or not the number of occupants NM is one or less. When the occupant count NM is less than or equal to one (S12: YES), i.e., the occupant is only the driver and no passenger is present, CPU 210 advances the process to S23. In the present embodiment, the first number of persons is one. The first number of persons is determined in advance based on the use of hybrid electric vehicle 10 and the like.

In S23, CPU 210 sets the defined deposition amount AL to the first deposition amount AL1. The first deposition amount AL1 is a value smaller than a limit value of the deposition amount AA. The limit of the deposition amount AA is the upper limit amount on which the particulate filter 29 can be deposited. Thereafter, CPU 210 advances the process to S24.

In S24, CPU 210 sets the defined dilution DL to the first dilution DL1. The first dilution amount DL1 is a value smaller than the limit value of the dilution amount DA. The limit of dilute DA is the upper limit that can be allowed to enter the oil. Thereafter, CPU 210 ends the series of processes. Then, CPU 210 performs start-up control using the specified deposit amount AL and the specified dilution amount DL that are set.

On the other hand, when the occupant number NM is not one or less (S12: NO), that is, when there is a passenger in addition to the driver in the occupant, CPU 210 advances the process to S25. In the present embodiment, the second number is an arbitrary number of two or more persons. The number of second persons is determined in advance based on, for example, how hybrid electric vehicle 10 is used.

In S25, CPU 210 sets the defined deposition amount AL to the second deposition amount AL2. The second deposition amount AL2 is a limit of the deposition amount AA. Thereafter, CPU 210 advances the process to S26.

In S26, CPU 210 sets the defined dilution DL to the second dilution DL2. The second dilution DL2 is the limit of the dilution DA. Thereafter, CPU 210 ends the series of processes. Then, CPU 210 performs start-up control using the specified deposit amount AL and the specified dilution amount DL that are set.

In this embodiment, S23 and S24 are the relaxation control. In the present embodiment, the first number of passengers is the number of passengers indicating the absence of passengers. On the other hand, the second number is the number of passengers indicating the presence of passengers. That is, CPU 210 relaxes the execution condition EC when the number of passengers NM indicating that the passenger is not present is the first number of passengers, that is, when the number of passengers is 1, than the execution condition EC when the number of passengers NM indicating that the passengers is present is the second number of passengers or more, that is, when the number of passengers is 2 or more. Specifically, in S23, CPU 210 sets the defined deposition amount AL to a first deposition amount AL1 smaller than the second deposition amount AL2. That is, CPU 210 reduces the prescribed deposit AL when the number of occupants NM is one or more than two. In S24, CPU 210 sets the defined dilution DL to a first dilution DL1 that is less than the second dilution DL2. That is, CPU 210 reduces the prescribed dilution DL when the number of occupants NM is one or more than two.

Effect of One Embodiment (1) According to the above-described embodiment, by CPU 210 relaxation control, when the number of occupants NM is one, the execution-condition EC is relaxed more than when the number of occupants NM is two or more. Therefore, when the number of occupants NM is one, CPU 210 is easier to perform the start control than when the number of occupants NM is two or more. As a result, when the number of occupants NM is one, the diluting amount DA and the accumulated amount AA are reduced by starting the engine 20. Therefore, CPU 210 suppresses the diluting amount DA and the depositing amount AA from becoming large when the number of occupants NM is two or more. Consequently, CPU 210 can suppress an increase in the chance of starting control when NM of the number of occupants is two or more. Therefore, CPU 210 can prevent an increase in the number of occupants that impair comfort due to the start of the engine 20.

(2) According to the above-described embodiment, in the relaxation control, CPU 210 reduces the prescribed dilution amount DL compared to the case where the number of occupants NM is two or more. Therefore, CPU 210 can easily satisfy the execution-condition EC by repeating the same start-up control process.

(3) According to the above-described embodiment, in the relaxation control, CPU 210 reduces the prescribed deposit AL compared to the case where the number of occupants NM is two or more. Therefore, CPU 210 can easily satisfy the execution-condition EC by repeating the same start-up control process.

(4) According to the above embodiment, the occupant includes a passenger. Then, CPU 210 relaxes the execution-condition EC by the relaxation control as compared with the case of the number of occupants NM indicating the state in which the passenger is present when the number of occupants is NM indicating the state in which the passenger is not present. Therefore, CPU 210 makes it easier to start the engine 20 when there is no passenger, thereby preventing the dilution amount DA and the accumulation amount AA from becoming large when there is a passenger. Consequently, CPU 210 can prevent an increase in the chance of starting control when a passenger is present.

OTHER EMBODIMENTS

The present embodiment can be modified and implemented as follows. The present embodiment and modification examples described below may be carried out in combination of each other within a technically consistent range.

Hybrid electric vehicle 10 may not be plug-in hybrid electric vehicle. That is, the battery 40 may not be chargeable from the external power supply 90. For example, the battery 40 may only be charged in the hybrid running mode.

It should be noted that hybrid electric vehicle 10 is more likely to travel in the motor running mode when hybrid electric vehicle 10 is plug-in hybrid electric vehicle than when plug-in hybrid electric vehicle is not used. Therefore, DA of dilutions and AA of deposits tend to be large because the engine 20 is less likely to be started. Therefore, when hybrid electric vehicle 10 is plug-in hybrid electric vehicle, the effectiveness can be greatly obtained.

The configuration of the control device 100 is not limited to the example of the above-described embodiment. For example, the system control unit 200 may directly control the engine 20, or may control the first motor generator 51 and the second motor generator 52. Further, for example, the engine control unit 400 may execute the start control program P1 or may execute the relaxation control program P2. For example, the engine control unit 400 may execute the start control program P1, and the system control unit 200 may execute the relaxation control program P2.

The various sensors are not limited to the examples of the above-described embodiments. For example, the occupant detection sensor 84 is constituted by a camera, and may detect an occupant on an image acquired by the camera. Further, for example, the occupant detection sensor 84 may be a weight sensor provided in hybrid electric vehicle 10. The occupant may be detected by a weight sensor. The occupant detection sensor 84 may detect an occupant without distinguishing between the driver and the passenger. The occupant detection sensor 84 may detect the occupant by distinguishing the observer in addition to the driver and the passenger. If hybrid electric vehicle 10 is operated automatically, a supervisor may ride on behalf of or in addition to the driver. In this case, the number of the first person may be zero, and the number of the second person may be one or more. In addition, in a case where a supervisor rides in addition to the driver, the first number may be a number of two or less persons, and the second number may be a number of three or more persons. In such cases, CPU 210 may make an affirmative determination when the occupant number NM is the first number of persons by S22 determination, and may make a negative determination when the occupant number NM is the second number of persons. The first number of persons may be 9 or less, and the second number may be 10 or more. In addition, the occupant detection sensor 84 may detect the number of passengers only as the occupant number NM.

The occupant detection sensor 84 only detects the occupant, and may input data indicating an image in which the occupant is detected to the control device 100. In this case, in the occupant number acquiring process, CPU 210 may acquire the occupant number NM by calculating the occupant number NM on the basis of the image in which the occupant detected by the occupant detection sensor 84 is detected.

CPU 210 may determine S14 regardless of S13 determination. That is, CPU 210 may determine whether or not the deposition amount AA exceeds the specified deposition amount AL and/or the dilution amount DA exceeds the specified dilution amount DL by performing both S13 and S14 treatments. In this case, when both of the two conditions are satisfied, CPU 210 may determine that the execution condition EC is satisfied.

The contents of the start control are not limited to the example of the above-described embodiment. For example, CPU 210 may start the engine 20 by performing the filter regeneration processing after performing the volatilization processing, or may perform the filter regeneration processing when an affirmative determination is made in S13, and may perform the volatilization processing when an affirmative determination is made in S14. At least CPU 210 may start the engine 20 in the start-up control.

The content of the relaxation control is not limited to the example of the above-described embodiment. CPU 210 does not have to reduce the defined deposition amount AL to less than the second deposition amount AL2 by omitting S23 process. In addition, CPU 210 does not need to reduce the specified dilution amount DL to less than the second dilution amount DL2 by omitting S24 process. Further, in the relaxation control, CPU 210 may decrease the specified dilution amount DL and the specified accumulation amount AL as the occupant number NM decreases.

The control device 100 may be configured as a circuitry including one or more processors that execute various processes in accordance with a computer program (software). Note that the control device 100 may be configured as a circuit including one or more dedicated hardware circuits such as an application-specific integrated circuit (ASIC) that executes at least some of the various processes, or a combination thereof. The processor includes a central processing unit (CPU) and a memory such as a random access memory (RAM) and a read only memory (ROM). The memory stores a program code or a command configured to cause the CPU to execute the process. Memory or computer readable media includes any available media that can be accessed by a general purpose or special purpose computer.

What is claimed is:

1. A hybrid electric vehicle, comprising:

an engine including a particulate filter provided in an exhaust passage;

an oil pan that stores oil;

a motor generator serving as a drive source different from the engine;

an occupant detection sensor configured to detect an occupant; and a processor configured to:

perform a dilution amount calculation process that calculates a dilution amount of the oil stored in the oil pan;

perform a deposition amount calculation process that calculates a deposition amount of particulate matter deposited on the particulate filter;

perform an occupant number acquisition process that acquires a number of occupants based on a detection result from the occupant detection sensor;

determine whether the hybrid electric vehicle is in an electric driving state in which the hybrid electric vehicle is traveling using a driving force of the motor generator without operating the engine;

upon a determination that the hybrid electric vehicle is in the electric driving state, perform start-up control that starts the engine in response to satisfaction of an execution condition that is satisfaction of at least either of a condition that the dilution amount exceeds a specified dilution amount determined in advance and a condition that the deposition amount exceeds a specified deposition amount determined in advance; and perform relaxation control that relaxes the execution condition when the number of occupants is a first number compared to the execution condition when the number of occupants is a second number larger than the first number, wherein:

the first number is one or greater.

2. The hybrid electric vehicle according to claim 1, wherein in the relaxation control, the specified dilution amount is set smaller when the number of occupants is the first number than the specified dilution amount when the number of occupants is the second number.

3. The hybrid electric vehicle according to claim 1, wherein in the relaxation control, the specified deposition amount is set smaller when the number of occupants is the first number than the specified deposition amount when the number of occupants is the second number.

4. The hybrid electric vehicle according to claim 1, wherein:

each occupant is a driver or a passenger;

the first number is a number indicating a state in which the driver is present; and the second number is a number indicating a state in which the passenger is present.

5. The hybrid electric vehicle according to claim 1, wherein the processor is further configured to perform the relaxation control while the hybrid electric vehicle is not being autonomously driven.

6. The hybrid electric vehicle according to claim 1, wherein the processor is further configured to perform the relaxation control when a driver is in the hybrid electric vehicle.

* * * * *